May 8, 1928.
J. ZUBATY
1,668,750
SPEEDOMETER DRIVE GEAR
Filed Jan. 29, 1926
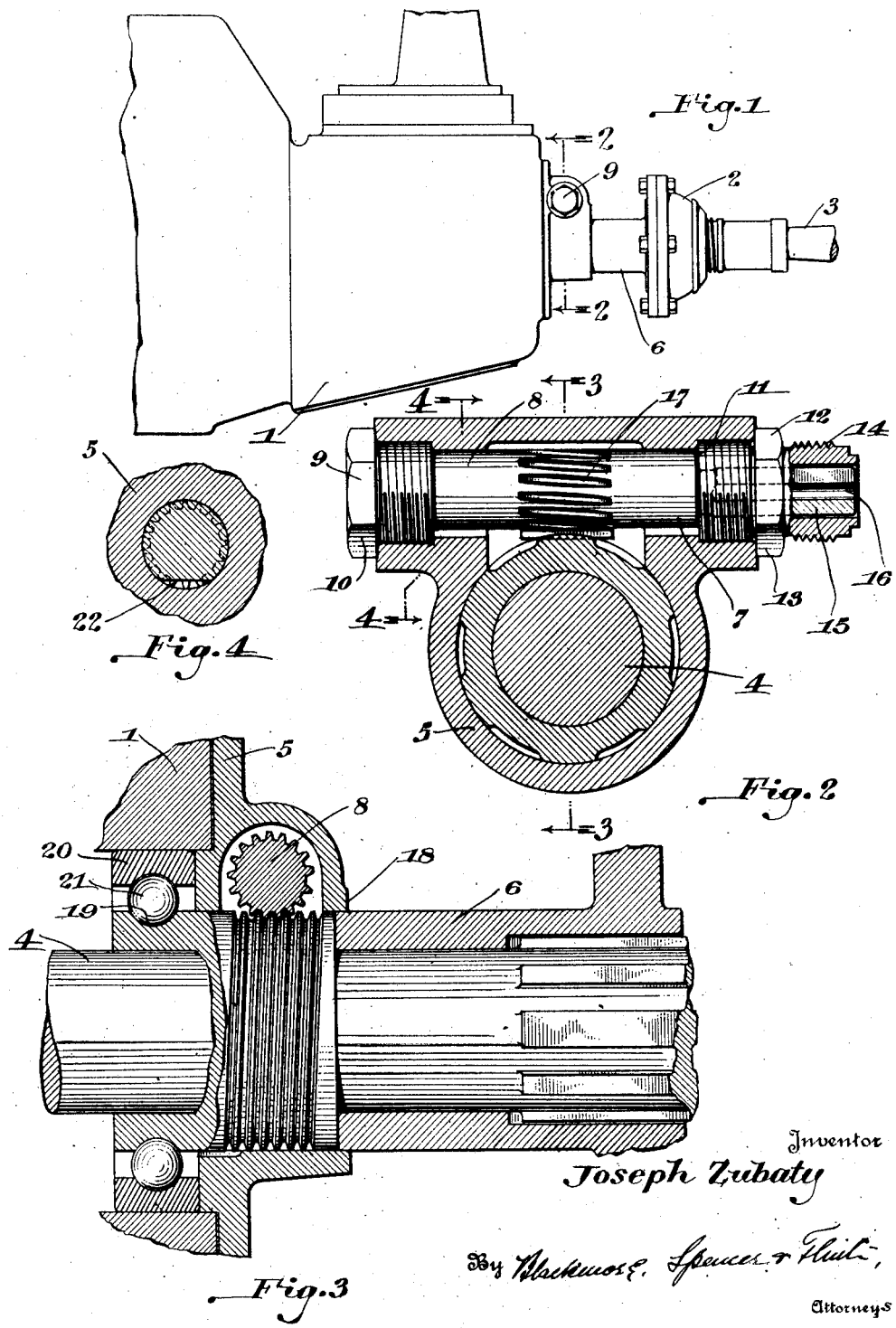
Inventor
Joseph Zubaty
By Blackmore, Spencer & Fluit
Attorneys Patented May 8, 1928.

1,668,750

UNITED STATES PATENT OFFICE.

JOSEPH ZUBATY, OF FLINT, MICHIGAN, ASSIGNOR TO A C SPARK PLUG COMPANY, OF FLINT, MICHIGAN.

SPEEDOMETER-DRIVE GEAR.

Application filed January 29, 1926. Serial No. 84,793.

This invention relates to an improvement in the mechanism for taking power from the transmission shaft of a motor vehicle to drive a speedometer or other instrument. Its usefulness is, however, not so restricted. Numerous other applications will be obvious.

At the rear end of the transmission housing the transmission shaft is usually provided with a bearing, a driving worm for a speedometer connection, and an oil tight packing. With the driving worm is associated a driven gear mounted on a transverse shaft in the housing or in an auxiliary housing connected to the main transmission case. The driven shaft is connected to the flexible speedometer shaft.

It is an object of this invention to form the driving element as a worm, the angular direction of the teeth of which serve to effect a lubricant or pump seal functioning to return to the housing any oil leaking therefrom.

A further object is to make the worm and the inner ball race as a single integral member. This member therefore performs the triple function, serving as the inner ball race, as a driving worm, and as a lubricant seal. When associated with the remainder of the roller bearing it is insertible as a unit, thus making it possible to assemble at once the equivalent of the three heretofore independent parts, the bearing, the worm and the packing.

A still further object is to arrange the mounting of the transverse driven shaft such that it may be assembled from either end.

The above and other objects are obtained by the structure herein described and shown in the accompanying drawing.

In the drawing, Figure 1 is a side elevation of the usual transmission housing and universal joint of a motor vehicle showing the position of the speedometer power take off. Figure 2 is a transverse section on line 2—2 of Figure 1. Figure 3 is a section on line 3—3 of Figure 2, a part being in elevation to show the angularity of the teeth of the worm. Figure 4 is a detail section on line 4—4 of Figure 2.

Referring to the drawing for a more complete description, numeral 1 designates the transmission housing of a motor vehicle. Numeral 2 is the housing for the usual universal joint between the propeller shaft 3 and the transmission shaft 4. To the rear end of the transmission housing is secured a supplemental housing represented by reference character 5. The supplemental housing partially covers the opening in housing 1 through which extends the shaft 4, the housings 1 and 5 constituting together the complete housing. The rear end of this supplemental housing overlaps the front end 6 of the sleeve projected forwardly from the universal joint housing. Within the housing 5 is journalled in aligned bearing openings 7 a transverse shaft 8. Each opening is provided with internal threads, one opening receiving a threaded plug 9 acting as a thrust bearing and having a flange 10 which engages the outer wall of the casing. The inner end of shaft 8 engages the innermost portion of plug 9 when the plug is in position. The other end of shaft 8 is reduced to form a shoulder 11 located with a clearance from the inner end of a sleeve 12 threaded into the opposite opening of the housing. The sleeve has a flange 13 engaging the outside wall of the supplemental housing 5, and at its outer end is threaded as at 14 for connection with the casing of the flexible speedometer shaft. The reduced end 15 of shaft 8 extends freely through the sleeve where it is provided with a recess 16 for engaging fastening means serving to attach shaft 15 with the driven speedometer shaft.

It is desirable to be able to assemble a speedometer driven shaft, like shaft 8, from either end of the housing. As a matter of simplicity and of economy in manufacture it is desirable to utilize both housing openings through which the shaft is assembled as bearings without the addition of separable bearing members. My arrangement makes possible the use of the housing openings at both ends of the shaft as bearings and permits the assembly from either end. Obviously the teeth on the shaft must not extend radially beyond the radial extent of the shaft at either bearing portion if the shaft is to be inserted at either end. I, therefore, cut the teeth into the cylindrical surface so that the shaft may be inserted through either bearing opening. The projecting teeth of the driving gear would, however, engage the bearing surface portion of the shaft and prevent its insertion or removal. To overcome this difficulty the shaft is provided with flats 22, as shown in the drawing, extending from each end to the portion where the gear teeth are cut. In the act of assembly or removal shaft 8 is rotated on its axis to a position where the flats lie opposite the projecting teeth of the driving gear. The shaft may then be inserted from either end and the plug 9 and the sleeve 12 inserted in position.

In alignment with the universal housing sleeve 6 and extending through the supplemental housing and into the transmission housing is a sleeve 18. The sleeve surrounds and rotates with the transmission shaft and performs the double function of an inner ball race and a driving worm. At its inner end it is grooved as at 19 to form the ball race cooperating with the outer ball race 20, the ball bearing therebetween being shown at 21. The spiral worm has its teeth at such an angle with reference to the direction of rotation of the shaft that the shaft when rotated tends to return to the housing any lubricant escaping around the roller bearing and which may find its way between the teeth of the worm on the shaft 4. This is shown in Figure 3. The part 18 performs, therefore, the added function of a seal and obviates the necessity for packing.

The structure as herein defined, has the following advantages. Leaking of oil is prevented by the driving worm. The use of packing is therefore rendered unnecessary. Combining of the inner race with the worm in a single part reduces the number of parts and facilitates assembling. The mounting of shaft 8 has the obvious advantage of permitting the assembling of said shaft from either side of the transmission housing.

I claim:

1. In an instrument drive comprising a housing, a shaft extending therefrom, spiral teeth on said shaft, a transverse shaft having a gear in engagement with said teeth, the spiral teeth being surrounded by the housing wall at the point of emergence of said shaft and having such angularity as to cooperate with the housing wall in sealing the housing from leakage upon the rotation of the shaft.

2. In combination, a gear casing, a transmission shaft projecting therefrom, a roller bearing therefor adjacent the casing wall, a supplemental gear casing surrounding the projecting end of the shaft, a driving gear on said transmission shaft within the supplemental casing, the gear being integral with the inner bearing race, the teeth of the gear being so positioned as to perform, in cooperation with the surrounding casing wall, the function of the lubricant seal.

3. In an instrument drive, a transmission housing, a transmission shaft therein, said housing formed with an opening therethrough, the axis of which is at an angle with the axis of said transmission shaft, portions of said opening on each side of said transmission shaft forming bearings, a second shaft journalled in said bearings, gearing between said transmission shaft and said second shaft, a plug and a sleeve positioned in said openings outside said bearing portions, one, when in position, engaging an end of said second shaft, the other engaging a portion of said second shaft adjacent its opposite end.

4. A casing, a shaft, said casing having aligned openings serving as shaft bearings and through either of which said shaft may be assembled, said shaft having a gear portion between said bearing portions, said shaft also having flats on either side of the gear portion and extending from said gear portion to the ends of said shaft.

5. In combination, a gear housing, a transmission shaft projecting therefrom, a roller bearing therefor adjacent the projecting end, a worm on said shaft at the outer side of said roller bearing and within the housing at the position of emergence of the shaft, the worm teeth being so shaped as to act in cooperation with said housing wall as an oil seal.

6. The combination as set forth in claim 5 wherein the inner bearing race is integral with the worm.

7. In a power transmission device, a casing, a shaft therein, a bearing for said shaft, means associated with said shaft serving as a driving gear and surrounded by the said casing at the point of emergence of said shaft to constitute an oil seal.

8. A power transmission device, a casing, a shaft therein, a single part associated with said shaft serving as a driving gear and an anti-friction bearing race, said part surrounded by said casing at the position of emergence of said shaft to further function, in cooperation with said casing, as an oil seal.

In testimony whereof I affix my signature.

JOSEPH ZUBATY.